United States Patent [19]
Takayama

[11] Patent Number: 5,477,387
[45] Date of Patent: Dec. 19, 1995

[54] ZOOM LENS BARREL WITH FOCUS INTERLOCKING RING

[75] Inventor: Toru Takayama, Kawasaki, Japan

[73] Assignee: Nikon Corporation, Tokyo, Japan

[21] Appl. No.: 193,480

[22] Filed: Feb. 8, 1994

[30] Foreign Application Priority Data

Feb. 26, 1993 [JP] Japan ................................... 5-063439
Feb. 26, 1993 [JP] Japan ................................... 5-063440

[51] Int. Cl.⁶ .................................................. G02B 7/10
[52] U.S. Cl. ........................ 359/702; 359/701; 359/699; 359/694
[58] Field of Search .................................. 359/703, 700, 359/701, 702, 704, 706, 825, 699, 694

[56] References Cited

U.S. PATENT DOCUMENTS

| | | | |
|---|---|---|---|
| 4,229,074 | 10/1980 | Nonogaki | 359/701 |
| 4,299,470 | 11/1981 | Shimizu | 354/286 |
| 4,681,406 | 7/1987 | Naito | 354/694 |
| 4,945,372 | 7/1990 | Higuchi | 354/199 |
| 5,144,490 | 9/1992 | Yamanouchi | 359/700 |

*Primary Examiner*—Georgia Y. Epps
*Assistant Examiner*—Ricky Mack

[57] ABSTRACT

A zoom lens barrel including a fixed barrel, a zoom operating ring movable in an optical axis direction to effect zooming, a focusing operating ring provided on the zoom operating ring for rotation about the optical axis, a cam ring for moving lens units to predetermined positions during zooming and during focusing, in operative association with the zoom operating or focusing operating rings, at least one first lens holding ring movable in the optical axis direction in operative association with the zoom operating ring, at least one second holding ring movable in the optical axis direction in operative association with the zoom operating ring and movable in the optical axis direction in operative association with the rotation of the focusing operating ring, and holding a second and subsequent ones of the lens units, a focus interlocking ring held on the fixed barrel for rotation about the optical axis and having a key way and a rectilinear movement slot, an interlocking key provided integrally with the focusing operating ring and engaged with the key way, and an engagement pin provided integrally with the at least one second lens holding ring, and fitted in a cam slot for zooming and focusing provided in the cam ring and the rectilinear movement slot to move the at least one second lens holding ring in the optical axis direction by the focusing operating ring rotation.

10 Claims, 4 Drawing Sheets

ZOOM LENS BARREL WITH FOCUS INTERLOCKING RING

BACKGROUND OF THE INVENTION

1. Field of the Invention

This invention relates to a zoom lens barrel having a focusing adjusting mechanism.

2. Related Background Art

In a zoom lens barrel capable of effecting AF (auto focusing), if a clutch or the like is provided to thereby provide one-operation zoom when the zooming operation is made into the direct advance type, the structure will become complicated and costs will become high and, therefore, a focusing operating ring is provided on a zoom operating ring so as to be movable in the direction of the optical axis with the zoom operating ring.

If such an arrangement is adopted, during AF, the focusing operating ring can be retained so that fingers may not touch it, and during MF (manual focusing), zooming is effected with the focusing operating ring retained so that fingers may touch it, whereby focusing can be done smoothly without changing the shift from zooming to focusing.

In the prior art described above, there is adopted the forward lens movement system in which a one-unit lens is moved back and forth in the direction of the optical path to thereby effect focusing, but the one-unit lens is relatively large in lens diameter as compared with the Other lens units, and this has led to a problem that when a motor is driven by AF, the load becomes great and the focusing speed becomes low.

SUMMARY OF THE INVENTION

It is the object of the present invention to solve the above-noted problem and to provide a zoom lens barrel in which, without spoiling the operability of one-operation zoom, the internal focusing zoom wherein focusing is effected by a second and subsequent follower lens units is enabled by simple constituents and the focusing time during AF can be shortened.

The present invention solve the above-noted problem by solving means as will be described hereinafter.

A zoom lens barrel according to the present invention is of a construction including a fixed barrel, a zoom operating ring movable in the direction of the optical axis to thereby effect zooming, a focusing operating ring provided on said zoom operating ring for rotation about the optical axis, a cam ring of a cam-like shape for moving each lens unit to a predetermined position during zooming and during focusing in operative association with the operation of said zoom operating ring or said focusing operating ring, one or more lens holding rings movable in the direction of the optical axis in operative association with the movement of said zoom operating ring to thereby be concerned in zooming, one or more lens holding rings movable in the direction of the optical axis in operative association with the movement of said zoom operating ring to thereby be concerned in zooming, and movable in the direction of the optical axis in operative association with the rotation of said focusing operating ring to thereby be concerned in focusing, and holding a second and subsequent follower lens units, a focus interlocking ring held on said fixed barrel for rotation about the optical axis and having a key way and a rectilinear movement slot, an interlocking key provided integrally with said focusing operating ring and engaged with said key way of said focus interlocking ring, and an engagement pin provided integrally with said one or more lens holding rings concerned in both of zooming and focusing and fitted in a cam slot for zooming and focusing provided in said cam ring and said rectilinear movement slot provided in said focus interlocking ring to move said one or more lens holding rings concerned in both of zooming and focusing in the direction of the optical axis by the rotation of said focusing operating ring.

Also, a zoom lens barrel according to the present invention is of a construction including a fixed barrel, a zoom operating ring movable in the direction of the optical axis to thereby effect zooming, a focusing operating ring provided on said zoom operating ring for rotation about the optical axis, a cam ring of a cam-like shape for moving each lens unit to a predetermined position during zooming and during focusing in operative association with the operation of said zoom operating ring and said focusing operating ring, one or more lens holding rings movable in the direction of the optical axis in operative association with the movement of said zoom operating ring to thereby be concerned in zooming, one or more lens holding rings movable in the direction of the optical axis in operative association with the movement of said zoom operating ring to thereby be concerned in zooming and movable in the direction of the optical axis in operative association with the rotation of said focusing operating ring to thereby be concerned in focusing, and holding a second and subsequent follower lens units, a focus interlocking ring held on said fixed barrel for rotation about the optical axis and having a key way, and an interlocking key provided integrally with said focusing operating ring and engaged with said key way of said focus interlocking ring and provided with a rectilinear movement slot.

In this case, an engagement pin provided integrally with said one or more lens holding rings concerned in both of zooming and focusing is fitted in a cam slot for zooming and focusing provided in said cam ring and the rectilinear movement slot of said interlocking key, and said one or more lens holding rings concerned in both of zooming and focusing are moved in the direction of the optical axis by the rotation of said focusing operating ring to thereby effect focusing.

According to the present invention, which is of the construction as described above, even in a zoom lens barrel of the direct advance type, there can be provided internal focusing zoom advantageous during AF, and it becomes possible to decrease the time required for focusing.

DETAILED DESCRIPTION OF THE PREFERRED EMBODIMENTS

The invention will hereinafter be described with respect to some embodiments thereof shown in the drawings.

Figure 1:
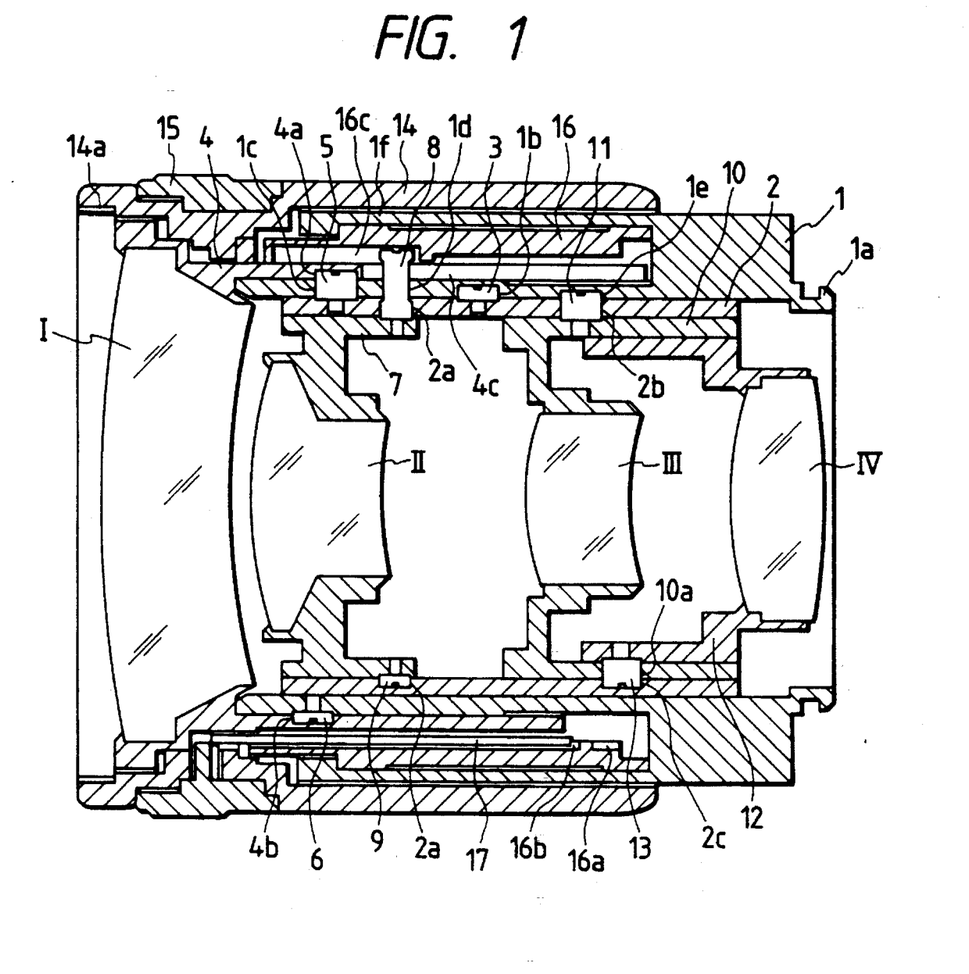
FIG. 1 is a cross-sectional view showing a first embodiment of the zoom lens barrel according to the present invention.

FIG. 1 is a cross-sectional view showing a first embodiment of the zoom lens barrel according to the present invention.

A fixed barrel 1 has a mount portion la to be coupled to a camera body (not shown) provided at the rear end thereof. A cam ring 2 is fitted to the inner periphery of the fixed barrel 1. The cam ring 2 has a cam pin 3 studded therein and fitted in the cam slot 1b of the fixed barrel 1.

A first-unit holding ring 4 is fitted to the outer periphery of the bore portion of the fixed barrel 1, and a lens unit I is held on the inner periphery of the fore end portion thereof. The cam ring 2 further has a cam pin 5 studded therein and fitted in the cam slot 4a of the first-unit holding ring 4 through the escape slot 1c of the fixed barrel 1. Also, the fixed barrel 1 has a pin 6 studded therein and fitted in the rectilinear movement slot 4b of the first-unit holding ring 4.

A second-unit holding ring 7 holding a lens unit II is fitted to the inner periphery of the cam ring 2. The second-unit holding ring 7 has cam pins 8 and 9 studded therein, the cam pins 9 being two short pins, the cam pin 8 being a long pin, and these pins are disposed at three circumferentially equally spaced apart locations. The cam pins 8 and 9 are fitted in the cam slots 2a of the cam ring 2.

Likewise, a third-unit holding ring 10 holding a lens unit III is fitted to the inner periphery of the cam ring 2. The third-unit holding ring 10 has cam pins 11 studded therein and fitted in the cam slot 2b of the cam ring 2 and the rectilinear movement slot 1e of the fixed barrel 1.

A fourth-unit holding ring 12 holding a lens unit IV is fitted to the inner periphery of the third-unit holding ring 10. The fourth-unit holding ring 12 has cam pins 13 studded therein and fitted in the rectilinear movement slot 10a of the third-unit holding ring 10 and the cam slot 2c of the cam ring 2.

A zoom operating ring 14 is disposed on the outer periphery of the first-unit holding ring 4 and is integrally fixed to the first-unit holding ring 4 by screws or the like, not shown. An attachment threaded portion 14a for attaching an accessory such as a filter is provided at the fore end of the zoom operating ring 14. A focusing operating ring 15 is held ahead of the outer peripheral portion of the zoom operating ring 14 for rotation about the optical axis and against movement in the direction of the optical axis.

The fixed barrel 1 has an outer diameter portion if protruding forwardly so as to form a U-shape, and the zoom operating ring 14 is slidably disposed on the outer periphery thereof.

A focus interlocking ring 16 is held on the inner periphery of the outer diameter portion if for rotation about the optical axis and against movement in the direction of the optical axis, and a segment gear portion 16a engageable with a reduction gear, not shown, is provided at the rear end of the focus interlocking ring 16. During AF, the reduction gear can be driven by a motor. Further, key ways 16b are provided inside the focus interlocking ring 16 and are engaged by interlocking keys 17 provided integrally with the focusing operating ring 15.

Figure 2:
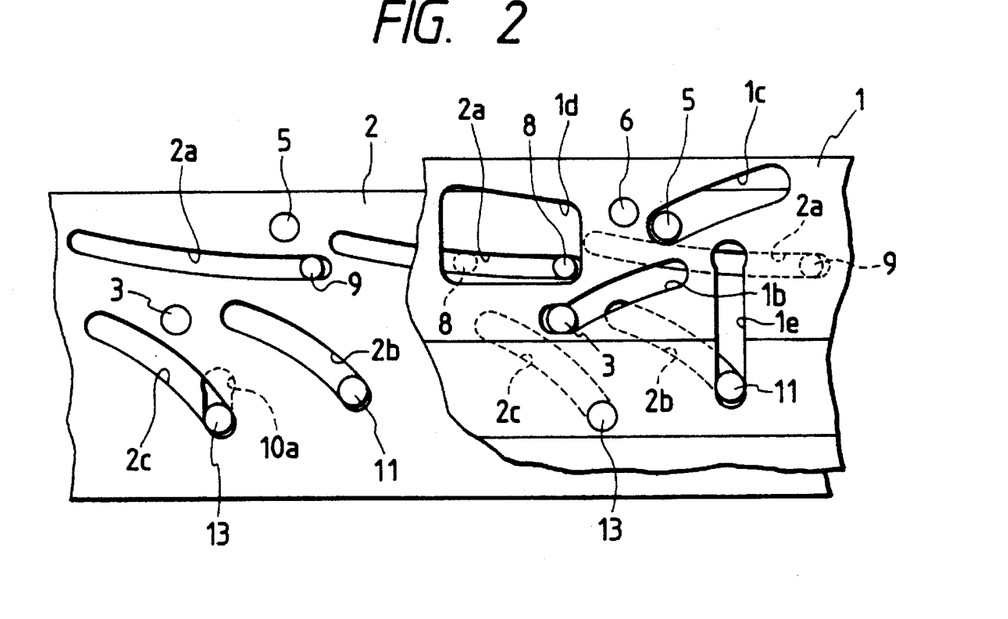
FIG. 2 is a developed view showing chiefly a fixed barrel in the first embodiment of FIG. 1 and a cam arrangement inside thereof.
Figure 3:
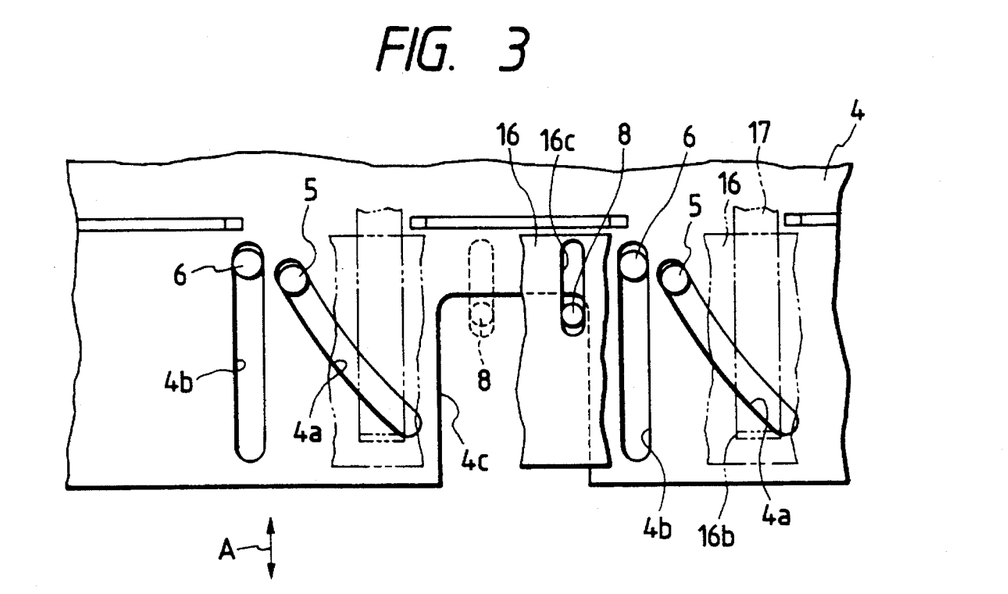
FIG. 3 is a developed view showing chiefly a first-unit holding ring in the first embodiment of FIG. 1 and an arrangement outside thereof.

FIGS. 2 and 3 are developed views showing the arrangement of the aforedescribed cam slots, etc., FIG. 2 showing the fixed barrel 1 and the cam arrangement inside thereof, and FIG. 3 showing the first-unit holding ring 4 and the arrangement outside thereof. FIGS. 2 and 3 are depicted with the positions thereof in the angular direction made coincident with each other.

In FIG. 2, the cam slots 1b, 2b, 2c, the rectilinear movement slots 1e, 10a, the escape slots 1c and the cam pins 3, 11, 13 are provided at two locations. Further, the cam slots 2a are provided at three locations, and of the cam pins engaged therewith, a cam pin 8 and two cam pins 9 are respectively provided, and a cut-away 1d for permitting the escape of the cam pin 8 is provided at a location.

In FIG. 3, the cam slots 4a, 4b and the cam pins 5, 6 are provided at two locations, and a cutaway 4c for permitting the escape of the cam pin 8 is also provided in the first-unit holding ring 4. The interlocking keys 17 are provided at angular positions opposed to each other, and are engaged with the key ways 16b of the focus interlocking ring 16. A rectilinear movement slot 16c is further provided in the focus interlocking ring 16, and the tip end portion of the cam pin 8 is fitted in the rectilinear movement slot 16c.

Description will now be made of the zooming and focusing operations in the zoom lens barrel of this embodiment.

Zooming is effected by holding the focusing operating ring 15 or the zoom operating ring 14 and moving it in the direction of the optical axis (the direction of arrow A). At this time, the cam ring 2 is rotated about the optical axis by the action of the cam slot 4a and the cam pin 5 and the action of the cam slot 4b and the cam pin 6 and at the same time, is moved also in the direction of the optical axis with its movement regulated by the cam slot 1b and the cam pin 3.

With the rotation of the cam ring 2, the second-unit holding ring 7 and the lens unit II are moved in the direction of the optical axis by the rectilinear movement slot 16c and the cam pins 8, 9. Also, the third-unit holding ring 10 and the lens unit III are moved in the direction of the optical axis by the cam slot 2b, the rectilinear movement slot 1e and the cam pin 11. At the same time, the fourth-unit holding ring 12 and the lens unit IV are moved in the direction of the optical axis by the cam slot 2c, the rectilinear movement slot 10a and the cam pin 13. As described above, zooming is accomplished by the movement of the four lens units in the direction of the optical axis.

The focusing operation will now be described. During AF, the focus interlocking ring 16 receives the motor drive from the camera body, not shown, and is rotated about the optical axis through a reduction gear, not shown, within the lens. At this time, the second-unit holding ring 7 is rotated by the engagement between the rectilinear movement slot 16c and the pin 8 and is moved in the direction of the optical axis while being restricted by the cam slot 2a, thereby bringing about the in-focus state as indicated by broken line in FIG. 3.

During manual focusing, when the focusing operating ring 15 is rotated, the focus interlocking ring 16 is rotated by the engagement between the interlocking key 17 integral with the focusing operating ring 15 and the key way 16b and further, the second-unit holding ring 7 is rotated by the engagement between the rectilinear movement slot 16c and the pin 8 and is moved in the direction of the optical axis while being restricted by the cam slot 2a, thereby bringing about the in-focus state.

A second embodiment will now be described.

Figure 4:
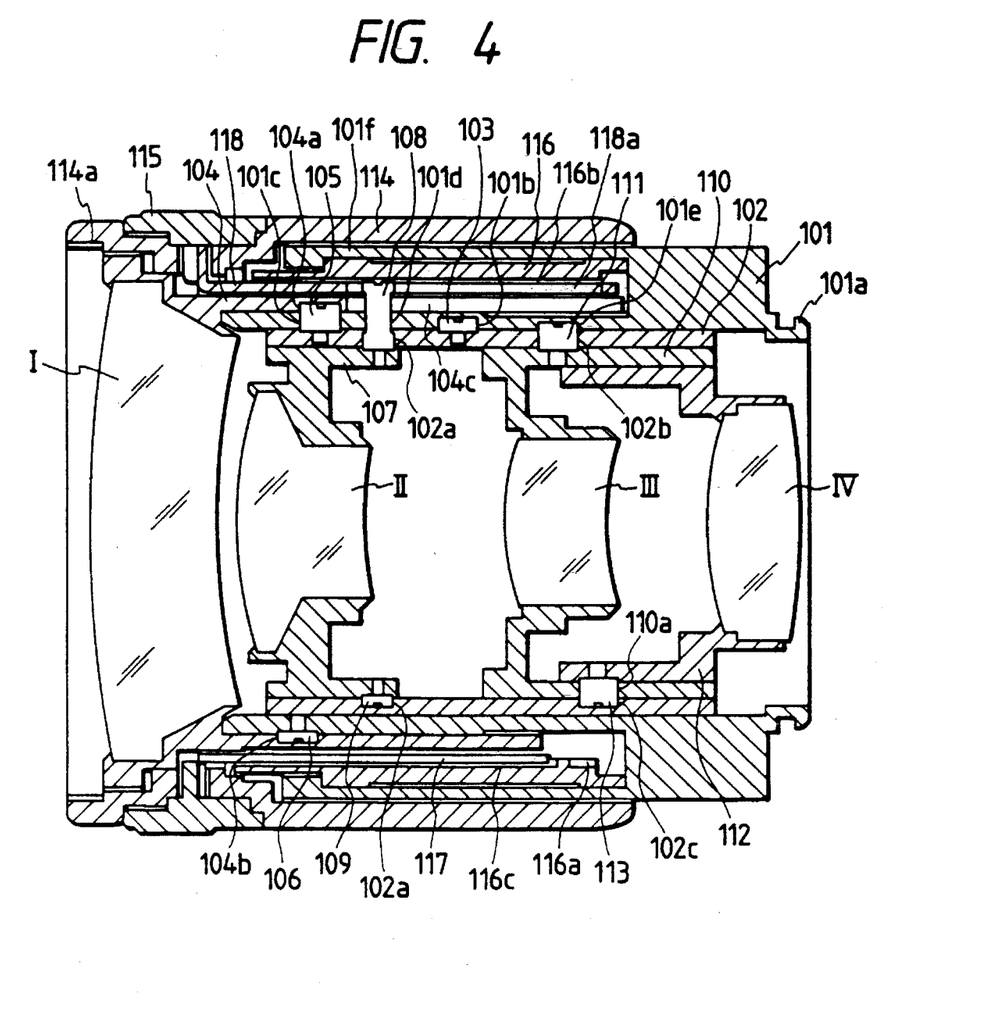
FIG. 4 is a cross-sectional view showing a second embodiment of the zoom lens barrel according to the present embodiment.
Figure 5:
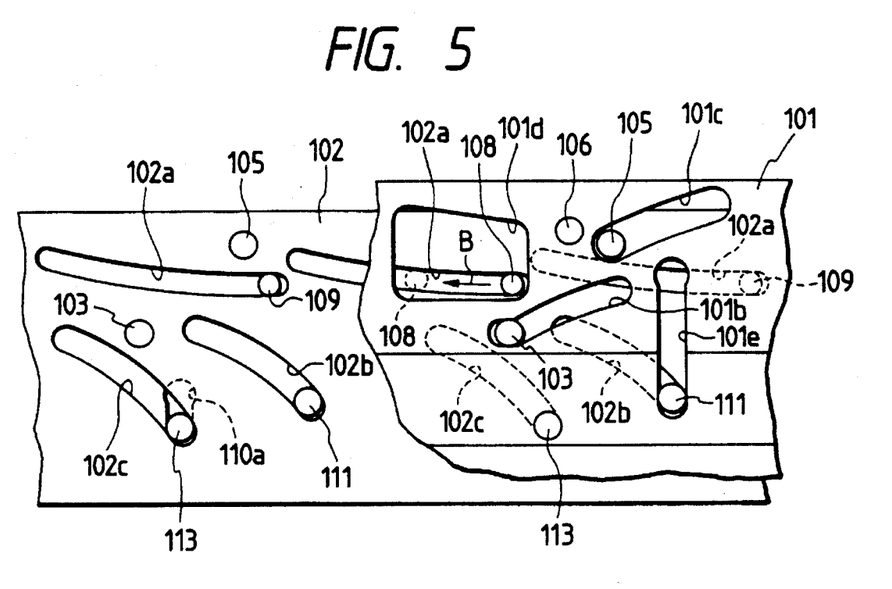
FIG. 5 is a developed view showing chiefly a fixed barrel in the embodiment of FIG. 4 and a cam arrangement inside thereof.
Figure 6:
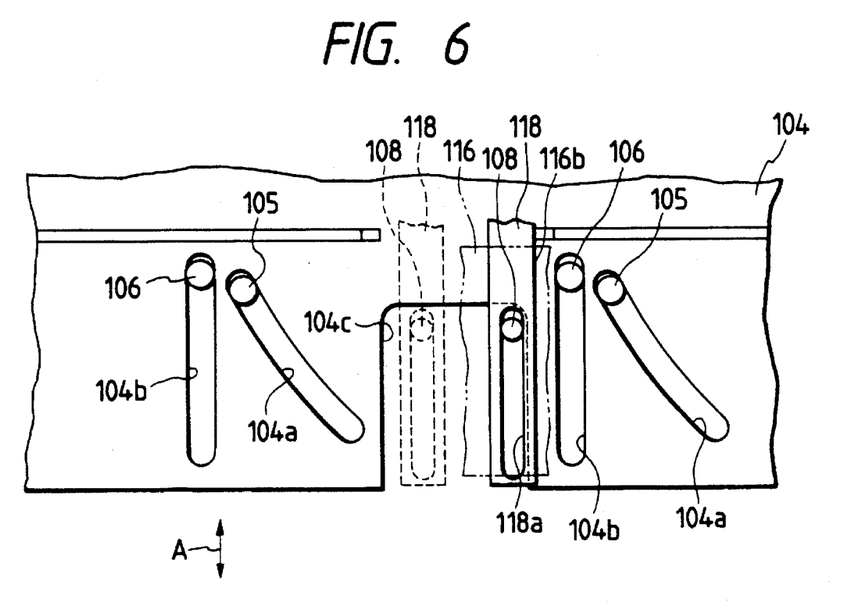
FIG. 6 is a developed view showing chiefly a first-unit holding ring in the embodiment of FIG. 4 and an arrangement outside thereof.

FIGS. 4 to 6 show a zoom lens barrel according to a second embodiment, and in these figures, portions similar to those in the first embodiment are designated by the same reference characters with a suffix 100 attached thereto.

In the second embodiment, key ways 116b and 116c are provided inside a focus interlocking ring 116 and are engaged by interlocking keys 117 and 118, respectively, provided integrally with a focusing operating ring 115.

FIGS. 5 and 6 are developed views showing the arrangement of the aforedescribed cam slots, etc., FIG. 5 showing a fixed barrel 101 and a cam arrangement inside thereof, and FIG. 6 showing a first-unit holding ring 104 and an arrangement outside thereof. FIGS. 5 and 6 are depicted with the positions thereof in the angular direction made coincident with each other.

In FIG. 6, cam slots 104a, rectilinear movement slots 104b and cam pins 105, 106 are provided at two locations, and a cut-away 104c for permitting the escape of a cam pin 108 is formed in a first-unit holding ring 104. Interlocking keys 117 and 118 are provided at angular positions opposed to each other, and are engaged with the key ways 116b and 116c, respectively, of a focus interlocking ring 116. (In FIG. 6, the interlocking key 117 is not shown.) The interlocking key 117 is further formed with a rectilinear movement slot 117a, in which the tip end portion of the cam pin 108 is fitted.

Description will now be made of the zooming and focusing operations in the zoom lens barrel of this embodiment.

Zooming is effected by holding the focusing operating ring 115 or the zoom operating ring 114 and moving it in the direction of the optical axis (the direction of arrow A). At this time, the cam ring 102 is rotated about the optical axis by the action of the cam slot 104a and the cam pin 105 and the action of the rectilinear movement slot 104b and the cam pin 106 and at the same time, is moved also in the direction of the optical axis with its movement regulated by the cam slot 101b and the cam pin 103.

With the rotation of the cam ring 102, the second-unit holding ring 107 and the lens unit II are moved in the direction of the optical axis by the cam slot 102a, the rectilinear movement slot 118a and the cam pins 108, 109. Also, the third-unit holding ring 110 and the lens unit III are moved in the direction of the optical axis by the cam slot 102b, the rectilinear movement slot 101e and the cam pin 111. Likewise, the fourth-unit holding ring 112 and the lens unit IV are moved in the direction of the optical axis by the cam slot 102c, the rectilinear movement slot 110a and the cam pin 113. As described above, zooming is accomplished by the movement of the four lens units in the direction of the optical axis.

The focusing operation will now be described. First, during AF, the focus interlocking ring 116 receives the motor drive from the camera body, not shown, and is rotated about the optical axis through a reduction gear, not shown, within the lens. At this time, the second-unit holding ring 107 is rotated by the engagement between the rectilinear movement slot 118a and the pin 108 through the interlocking key 118, and is moved in the direction of the optical axis while being restricted by the cam slot 102a, thereby bringing about the in-focus state as indicated by the broken lines in FIG. 6.

During manual focusing, when the focusing operating ring 115 is rotated, the second-unit holding ring 107 is rotated by the engagement between the rectilinear movement slot 118a of the interlocking key 118 integral with the focusing operating ring 115 and the pin 108, and is moved in the direction of the optical axis while being restricted by the cam slot 102a, thereby bringing about in-focus state.

As described above, according to the present invention, when during manual focusing, the zooming operation is to be performed with the focusing operating ring held, the operability of one-operation zoom in which shift can be made in a moment from the zooming operation to the focusing operation can be obtained in internal focusing zoom as well by relatively simple constituents.

What is claimed is:

1. A zoom lens barrel having a plurality of lens units, comprising:

a fixed barrel;

a zoom operating ring movable in a direction of an optical axis to effect zooming;

a focusing operating ring provided on said zoom operating ring for rotation about the optical axis;

a cam ring for moving each of said plurality of lens units to predetermined positions during zooming and during focusing, and in operative association with said zoom operating ring and said focusing operating ring;

at least one first lens holding ring movable in the direction of the optical axis in operative association with the movement of said zoom operating ring to perform zooming;

at least one second lens holding ring movable in the direction of the optical axis in operative association with the movement of said zoom operating ring to perform zooming and movable in the direction of the optical axis, and in operative association with the rotation of said focusing operating ring to perform focusing, and holding a second and subsequent ones of said plurality of lens units;

a focus interlocking ring held on said fixed barrel for rotation about the optical axis and having a key way responsible for focusing and a rectilinear movement slot responsible for focusing;

an interlocking key provided integrally with said focusing operating ring and engaged with said key way of said focus interlocking ring to transmit the rotation of said focusing operating ring to said focus interlocking ring; and an engagement pin provided integrally with said at least second one lens holding ring, and fitted in a cam slot for zooming and focusing provided in said cam ring and the rectilinear movement slot provided in said focus interlocking ring to move said at least one second ring in the direction of the optical axis by the rotation of said focusing operating ring.

2. A zoom lens barrel having a plurality of lens units, including:

a fixed barrel;

a zoom operating ring movable in a direction of an optical axis to effect zooming;

a focusing operating ring provided on said zoom operating ring for rotation about the optical axis;

a cam ring for moving each of said plurality of lens units to predetermined positions during zooming and during focusing, and in operative association with said zoom operating ring and said focusing operating ring;

at least one first lens holding ring movable in the direction of the optical axis in operative association with the movement of said zoom operating ring to perform zooming;

at least one second lens holding ring movable in the direction of the optical axis in operative association with the movement of said zoom operating ring to perform zooming and movable in the direction of the optical axis, and in operative association with the rotation of said focusing operating ring to perform focusing, and holding a second and subsequent ones of said plurality of lens units;

a focus interlocking ring held on said fixed barrel for rotation about the optical axis and having a key way responsible for focusing; and an interlocking key provided integrally with said focusing operating ring and engaged with said key way of said focus interlocking ring to transmit the rotation of said focusing operation ring to said focus interlocking ring and provided with a rectilinear movement slot.

3. A zoom lens barrel according to claim 2, further comprising an engagement pin formed integrally with said at least one second lens holding ring for performing zooming and focusing and fitted in a cam slot for zooming and focusing provided in said cam ring and the rectilinear movement slot of said interlocking key, to move said at least one second lens holding ring for performing both zooming and focusing by the rotation of said focusing operating ring in the direction of the optical axis to effect focusing.

4. A zoom lens barrel for attachment to a camera body, comprising:

a fixed barrel mountable on the camera body;

a zoom operating ring having an inner peripheral surface in contact with an outer peripheral surface of said fixed barrel and movable in a direction of an optical axis;

a first lens holding ring movable in the direction of the optical axis with said zoom operating ring;

a cam ring rotatable with the movement of said first lens holding ring in the direction of the optical axis, said cam ring having a cam slot;

a second lens holding ring having an engagement pin engaged with said cam slot of said cam ring;

a focusing operating ring provided on said zoom operating ring for rotation about the optical axis;

an interlocking key rotatable with said focusing operating ring; and a focus interlocking ring supported on said fixed barrel for rotation about the optical axis, said focus interlocking ring having, in order to take responsibility for focusing, a rectilinear movement slot extending in the direction of the optical axis, and a key way engaged by said interlocking key in order to be rotated with said interlocking key;

said engagement pin of said second lens holding ring being engaged with said rectilinear movement slot of said focus interlocking ring;

wherein when said zoom operating ring is moved in the direction of the optical axis, said first lens holding ring is moved in the direction of the optical axis and said second lens holding ring is moved in the direction of the optical axis by cam action of said engagement pin engaged with said rectilinear movement slot of said focus interlocking ring and said cam slot of said cam ring to effect zooming, and when said focusing operating ring is rotated about the optical axis, said second lens holding ring is moved in the direction of the optical axis by the cam action of said engagement pin engaged with said rectilinear movement slot of said focus interlocking ring and said cam slot of said cam ring to effect focusing.

5. A zoom lens barrel according to claim 4, further comprising a motor for driving said focus interlocking ring during autofocusing.

6. A zoom lens barrel according to claim 4, wherein said focus interlocking ring is limited in movement in the direction of the optical axis, and said interlocking key is engaged with said key way so as to be movable in the direction of the optical axis relative to said focus interlocking ring.

7. A zoom lens barrel for attachment to a camera body, comprising:

a fixed barrel mountable on the camera body;

a zoom operating ring having an inner peripheral surface in contact with an outer peripheral surface of said fixed barrel, and movable in a direction of an optical axis;

a first lens holding ring movable in the direction of the optical axis with said zoom operating ring;

a cam ring rotatable with the movement of said first lens holding ring in the direction of the optical axis, said cam ring having a cam slot;

a second lens holding ring having an engagement pin engaged with said cam slot of said cam ring;

a focusing operating ring provided on said zoom operating ring for rotation about the optical axis;

an interlocking key rotatable with said focusing operating ring, said interlocking key having a rectilinear movement slot responsible for focusing, said rectilinear movement slot extending in the direction of the optical axis; and a focus interlocking ring supported on said fixed barrel for rotation about the optical axis, said focus interlocking ring having, in order to take responsibility for focusing, a key way engaged with said interlocking key in order to be rotated with said interlocking key;

said engagement pin of said second lens holding ring being engaged with said rectilinear movement slot of said interlocking key;

wherein when said zoom operating ring is moved in the direction of the optical axis, said first lens holding ring is moved in the direction of the optical axis and said second lens holding ring is moved in the direction of the optical axis by cam action of said engagement pin engaged with said rectilinear movement slot of said interlocking key and said cam slot of said cam ring to effect zooming, and when said focusing operating ring is rotated about the optical axis, said second lens holding ring is moved in the direction of the optical axis by the cam action of said engagement pin engaged with said rectilinear movement slot of said interlocking key and said cam slot of said cam ring to effect focusing.

8. A zoom lens barrel according to claim 7, further comprising a motor for driving said focus interlocking ring during auto focusing.

9. A zoom lens barrel according to claim 7, wherein said focus interlocking ring is limited in movement in the direction of the optical axis, and said interlocking key is engaged with said key way so as to be movable in the direction of the optical axis relative to said focus interlocking ring.

10. A zoom lens barrel for attachment to a camera body, comprising:

a fixed barrel mountable on the camera body;

a zoom operating ring having an inner peripheral surface in contact with an outer peripheral surface of said fixed barrel, and movable in a direction of an optical axis;

a first lens holding ring movable in the direction of the optical axis with said zoom operating ring;

a cam ring rotatable with the movement of said first lens holding ring in the direction of the optical axis, said cam ring having a cam slot;

a second lens holding ring having an engagement pin engaged with said cam slot of said cam ring;

a focusing operating ring provided on said zoom operating ring for rotation about the optical axis; and a focus interlocking ring supported on said fixed barrel and rotatable about the optical axis with said focusing operating ring, said focus interlocking ring having a rectilinear movement slot extending in the direction of the optical axis in order to take responsibility for focusing;

said engagement pin, of said second lens holding ring being engaged with said rectilinear movement slot of said focus interlocking ring;

wherein when said zoom operating ring is moved in the direction of the optical axis, said first lens holding ring is moved in the direction of the optical axis and said second lens holding ring is moved in the direction of the optical axis by cam action of said engagement pin engaged with said rectilinear movement slot of said focus interlocking ring and said cam slot of said cam ring to effect zooming, and when said focusing operating ring is rotated about the optical axis, said second lens holding ring is moved in the direction of the optical axis by the cam action of said engagement pin engaged with said rectilinear movement slot of said focus interlocking ring and said cam slot of said cam ring to effect focusing.

* * * * *

UNITED STATES PATENT AND TRADEMARK OFFICE
CERTIFICATE OF CORRECTION

PATENT NO. : 5,477,387
DATED : December 19, 1995
INVENTOR(S) : TAKAYAMA

It is certified that error appears in the above-indentified patent and that said Letters Patent is hereby corrected as shown below:

Column 6, line 47, "ring" should be --ring,--;

Column 7, line 18, "focusing" should be --focusing,--;

Column 9, line 13, "pin,of" should be --pin, of--.

Signed and Sealed this

Twenty-third Day of April, 1996

Attest:

BRUCE LEHMAN

Attesting Officer

Commissioner of Patents and Trademarks